United States Patent [19]

Ahmed

[11] Patent Number: 4,562,098

[45] Date of Patent: Dec. 31, 1985

[54] WATER OR STEAM CURE OF AUTODEPOSITED RESIN COATINGS ON METALLIC SUBSTRATES

[75] Inventor: Bashir M. Ahmed, Ambler, Pa.

[73] Assignee: Amchem Products Inc., Ambler, Pa.

[21] Appl. No.: 629,924

[22] Filed: Jul. 11, 1984

Related U.S. Application Data

[63] Continuation-in-part of Ser. No. 517,133, Jul. 25, 1983, abandoned.

[51] Int. Cl.$^4$ .......................... B05D 3/04; B05D 3/02
[52] U.S. Cl. .................................. 427/341; 427/353; 427/377; 427/378; 427/379; 427/388.4
[58] Field of Search ...................... 427/372.2, 377, 379, 427/378, 341, 430.1, 435, 353, 388.4

[56] References Cited

U.S. PATENT DOCUMENTS

| | | | |
|---|---|---|---|
| 3,000,757 | 9/1961 | Johnston et al. | 427/353 X |
| 3,585,084 | 6/1971 | Steinbrecher et al. | 148/6.2 |
| 3,592,699 | 7/1971 | Steinbrecher et al. | 148/6.2 |
| 3,647,567 | 3/1972 | Schweri | 148/6.15 |
| 3,664,888 | 5/1972 | Oga et al. | 427/377 X |
| 3,689,292 | 9/1972 | Preston | 427/353 |
| 3,709,743 | 1/1973 | Dalton et al. | 148/6.2 |
| 3,795,546 | 3/1974 | Hall et al. | 148/6.2 |
| 3,922,451 | 11/1975 | Anschutz et al. | 427/388.4 X |
| 4,030,945 | 6/1977 | Hall et al. | 148/6.2 |
| 4,103,049 | 7/1978 | Nishida et al. | 427/341 |
| 4,180,603 | 12/1979 | Howell | 427/353 |
| 4,191,676 | 3/1980 | Hall | 260/29.7 |
| 4,243,704 | 1/1981 | Hall et al. | 427/327 |
| 4,313,861 | 2/1982 | Bassett et al. | 260/29.6 |
| 4,318,944 | 3/1982 | Hall | 427/377 |
| 4,347,172 | 8/1982 | Nishida et al. | 524/319 |
| 4,373,050 | 2/1983 | Steinbrecher et al. | 524/405 |
| 4,411,937 | 10/1983 | Nishida et al. | 427/435 |

*Primary Examiner*—Thurman K. Page
*Attorney, Agent, or Firm*—Ernest G. Szoke; Alexis Barron; Mark A. Greenfield

[57] ABSTRACT

Curing of autodeposited coatings by treatment with water or steam.

23 Claims, No Drawings

WATER OR STEAM CURE OF AUTODEPOSITED RESIN COATINGS ON METALLIC SUBSTRATES

CROSS-REFERENCE TO RELATED APPLICATION

This is a continuation-in-part of application Ser. No. 517,133, filed July 25, 1983 abandoned.

FIELD OF THE INVENTION

This invention relates to the formation of resinous coatings on metallic surfaces. More specifically, this invention relates to improved means for curing such coatings.

Autodeposition is a relatively recent development in the coating field whereby an aqueous resinous coating composition is low solids concentration (usually less than about 10%) forms a coating of high solids concentration (usually greater than about 10%) on a metallic surface immersed therein, with the coating increasing in thickness or weight the longer the time the metallic surface is immersed in the composition. Autodeposition is similar to electrodeposition, but does not require the aid of external electrical current to cause the resin particles to deposit on the metal surface. In general, autodepositing compositions are aqueous acid solutions having solid resin particles dispersed therein.

This invention relates to improved means for curing freshly formed autodeposited coatings.

REPORTED DEVELOPMENTS

Representative U.S. patents which relate to the field of autodeposition and which disclose autodepositing compositions and process steps are the following: Nos. 3,585,084, 3,592,699, and 4,373,050, each to Hall and Steinbrecher; 3,709,743; 4,180,603; 4,191,676; 4,347,172 and 4,411,937; 4,313,861; and 3,647,567, 3,795,546 and 4,030,945.

Various of the aforementioned patents disclose curing the freshly applied autodeposited coating by subjecting it to conditions under which the wet coating is dried and the resin particles are fused to render the coating continuous. This tends to improve the corrosion resistance of the coating and its adherence to the underlying metallic surface. The conditions under which the resin is cured involve subjecting the coated part to elevated temperatures for a suffificient period of time to effect drying and fusion of the coating, the specific temperatures and times being dependent on the nature of the resin comprising the coating and the mass of the coated part. Exemplary conditions include subjecting the coated part to temperature in excess of 100° C. for periods of time ranging from about 5 minutes to 30 minutes or more. The prior art discloses effecting such curing by placing the coated part in an oven or subjecting it to a stream of hot air. Aforementioned U.S. Pat. No. 4,191,676 discloses the effective use of baking the coating for a period of time until the metallic surface has reached the temperature of the environment in which it is being heated.

The present invention relates to an improved process for curing autodeposited coatings, and particularly those which can be cured at low temperatures, for example, in the range of about 20° to about 120° C.

SUMMARY OF THE INVENTION

The present invention relates to curing autodeposited coatings by subjecting them to water or steam for a relatively short period of time at a relatively low temperature.

The preferred coatings which are cured according to the process of the present invention are formed from an autodepositing composition in which the particles of resin are dispersed in an aqueous acidic solution which is prepared by combining hydrofluoric acid and a soluble ferric iron-containing ingredient, most preferably ferric fluoride.

The preferred resins for use in forming autodeposited coatings which are cured according to the present invention comprise externally stabilized vinylidene chloride copolymers and also internally vinylidene chloride copolymers containing in excess of 50 wt. % vinylidene chloride. Most preferably, the vinylidene chloride copolymer is crystalline in nature.

Curing autodeposited coatings by subjecting them to water, preferably hot water, or steam in accordance with the present invention is to be distinguished from prior art processes of the type which involve subjecting freshly-applied (uncured) autodeposited coatings to one or more steps which involve water treatment of the autodeposited coatings prior to curing them at elevated temperature such as baking the coated substrate in an oven, as described in various of the aforementioned patents. By way of background, it is noted that is is known to subject the freshly coated substrate, after it has been withdrawn from the coating bath, to steps which involve water rinsing the coating for the purpose of removing residual coating composition from the freshly-formed coating or for the purpose of improving the corrosion resistance of the coating, for example, by immersing the uncured coating into an aqueous solution of chromium-containing compounds. Water rinsing the coating after it has been subjected to the chromium-containing solution may be involved also. Such water-treating steps have not been designed to, in fact have not resulted in, the curing of the coating, as evidenced by the teachings in the aforementioned patents and by industrial practices of effecting the cure of the coating by baking at elevated temperatures.

It is noted further that U.S. Pat. No. 4,318,944 (assigned to the assignee of the present invention) discloses a method for preventing the cracking of freshly-formed autodeposited coatings. This method involves maintaining the coating in an environment substantially free of oxygen during at least a part of the time after the coated metallic surface has been withdrawn from the coating composition and before the coating is cured.

By way of background, it is noted that the aforementioned '944 patent teaches that certain types of autodeposited coatings tend to crack as the coated substrate is transferred from the coating bath to the curing oven. The cracking typically takes the form of many fire cracks (referred to as "mudcracking") which appear initially at the upper edges of the coating and then in other areas of the coating. Such cracks remain even after the coating has been cured. This patent discloses also that such cracking is observed in coatings which have been formed from a worked or aged bath of coating composition and only when such coating is exposed to oxygen, for example, as by being exposed to oxygen in the air. As explained in this patent, the cause of the cracking is believed to be due in part to oxidation of the resin brought on by exposure to oxygen in the air. The patent teaches that the cracking can be avoided by maintaining the coating in an environment substantially free of oxygen, for example, by surrounding the coated metallic surface with an inert gas such as nitrogen, or by maintaining on the coating an aqueous film such as exists on the coating after it has been withdrawn from the coating composition or from a water rinse or from treatment with a chromium-containing aqueous solution. In an environment of relatively low humidity, the water of such aqueous film tends to evaporate thereby exposing the coating to air, the oxygen of which tends to cause the coating to crack.

In accordance with the invention described in the aforementioned '944 patent, such aqueous film can be maintained or established or formed on the surface of the coating by maintaining the relative humidity of the ambient atmosphere above about 65%, and preferably above about 80°. According to this patent, the desired relative humidity can be provided by atomizing water into the air or injecting steam into the air which surrounds the coated substrate. Such means are disclosed as being used intermittently as is necessary to maintain the relative humidity in the desired range, that is, above about 65% and up to 100%.

The autodeposited coatings which are subjected to the conditions described in the aforementioned '944 patent for the purpose of preventing the cracking thereof are not cured under said conditions as evidenced by their being subjected to one or more baking stages, for example, as by being baked for 10 minutes in an oven at 170° C.

In contrast, the present invention includes subjecting autodeposited coatings to water or steam under conditions which effect cure of the coatings, as will be described in detail below. Savings in time, energy costs and capital investment can be realized by the practice of the present invention.

DETAILED DESCRIPTION OF THE INVENTION

Coating compositions which form autodeposited coatings of the type that can be cured in accordance with the present invention generally comprise resin-containing acidic aqueous compositions which function to attack and dissolve from a metallic surface contacted therewith metal ions in an amount sufficient to directly or indirectly cause resin particles in the region of the metallic surface to deposit thereon in a continuous fashion, that is, in a manner such that there is a buildup in the amount of resin deposited on the surface the longer the time the surface is in contact with the composition. This deposition of the resin on the metallic surface is achieved through chemical action of the coating composition on the metallic surface. The use of electricity which is necessary for the operation of electrocoating methods is not required.

The basic constituents of an autodepositing composition are water, resin solids dispersed in the aqueous medium of the composition and activator, that is, an ingredient(s) which converts the water/resin composition into one which will form on a metallic surface a resinous coating which increases in thickness or weight the longer the surface is immersed in the composition. Various types of activators or activating systems are known, for example, as reported in U.S. Patent Nos.: 3,592,699; 3,709,743; 4,103,049; 4,347,172; and 4,373,050, the disclosures of which are incorporated herein by reference. The activating system generally comprises an acid/oxidizing system, for example: hydrogen peroxide and HF; $HNO_3$; and a ferric-containing compound and HF; and other soluble metal-containing compounds (for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l) and an acid that can be used alone or in combination with hydrofluoric acid, and including, for example, sulfuric, hydrochloric, nitric, and phosphoric acid, and an organic acid, including, for example, acetic, chloracetic, and trichloracetic.

The preferred activating system comprises a ferric-containing compound and hydrofluoric acid. Thus, a preferred autodepositing composition comprises a soluble ferric-containing compound in an amount equivalent to about 0.025 to about 3.5 g/l ferric iron, most preferably about 0.3 to about 1.6 g/l of ferric iron, and hydrofluoric acid in an amount sufficient to impart to the composition a pH within the range of about 1.6 to about 5.0. Examples of the aforementioned ferric-containing compounds are ferric nitrate, ferric chloride, ferric phosphate, ferric oxide, and ferric fluoride, the last mentioned being preferred.

The types of autodeposited coatings that particularly lend themselves to being cured according to the present invention are those comprising resins which develop fully their coating properties at the elevated temperatures used, that is, temperatures up to 212° F. in the case of water and steam at atmospheric pressure, and higher temperatures in the case of super heated steam, and which are not degraded at such temperatures. In accordance with the present invention, it has been found that various types of autodeposited coatings can be "cured" or heated to such a degree that those properties which depend upon proper bake schedule, such as, for example, corrosion resistance, adhesion, and hardness can be readily achieved, even on massive parts, as well as relatively thin wall parts, by the simple expedient of treating the freshly coated part with hot water or steam. It is believed that the invention will be used most widely in curing autodeposited coatings comprising resins which have a minimum film temperature (MFT) or glass transition temperature (Tg) of no greater than about 140° F., preferably no greater than about 100° F., and most preferably no greater than about 85° F. Resins having such characteristics and appropriate for use in autodepositing compositions are known and are available commercially.

Examples of resins that can be used in autodepositing compositions to form coatings of the type that can be cured according to the present invention include vinyl-based resins, for example, acrylic and alkyl-substituted acrylic resins and resins prepared from other ethylenically unsaturated monomeric compounds. Examples of such resin are described in aforementioned U.S. Pat. Nos. 3,709,743 and 4,313,861, the disclosures of which are incorporated herein by reference. Resins of the aforementioned '861 patent can be used to form autodeposited coatings that have particularly good corrosion resistant properties when treated with an aqueous solution of chromium compounds and comprise a preferred class of resins for use in the present invention. Such resins, which can be prepared in the form of a latex, are the emulsion polymerized product of: (A) about 1 to about 20 wt. %, preferably about 4 to about 14 wt. %, of methacrylic acid or about 1 to about 12 wt. %, preferably about 4 to about 10 wt. %, of acrylic acid; (B) about 75 to about 99 wt. % of at least one other polymerizable ethylenically monounsaturated monomer; (C) 0 to about 20 wt. %, of a different hydroxy group containing polymerizable vinylenically monounsaturated monomer; and (D) 0 to about 1.5 wt. %, preferably no greater than about 1.25 wt. % of a polymerizable vinylenically polyunsaturated monomer. The aforementioned '861 patent discloses that preferred resins of the aformentioned type have a particle size of less than about 0.3 micron and more preferably a particle size of 0.15 micron or less. Preferred resins are characterized also as having a (Tg) of about 35° F. to about 120° F., more preferably about 45° F. to about 85° F. This patent discloses also that preferred resins are prepared from the following monomers: as component (B) above, styrene, methyl methacrylate, butyl acrylate, ethyl acrylate, or acrylonitrile; as component (C) above, hydroxyethyl acrylate; and as component (D) above, trimethylol propane triacrylate.

Particularly preferred classes of resins for use in forming autodeposited coatings which can be cured in accordance with the present invention comprise externally stabilized vinylidene chloride copolymers and internally stabilized vinylidene chloride copolymers containing in excess of 50 wt. % vinylidene chloride. Autodepositing compositions including such resins as described in U.S. patent application Ser. No. 629,911, filed of even date herewith, and entitled "Vinylidene Chloride Resin in Autodeposition", the disclosure of which is incorporated herein by reference. Of these two classes of resin, the internally stabilized copolymers are preferred. Most preferably each of the aforementioned resin classes is crystalline in nature. Autodeposited coatings prepared from vinylidene chloride-containing copolymers can have extremely high resistance to corrosion without being treated with an aqueous solution of chromium compounds or other post treatment steps designed to improve the corrosion resistance of autodeposited coatings.

As disclosed in said application, internally stabilized polymers or resins include as part of their chemical structure a surfactant group which functions to maintain polymer particles or resin solids in a dispersed state in an aqueous medium, this being the function also performed by an "external surfactant", that is, by a material which has surface-active properties and which is adsorbed on the surface of resin solids, such as those in colloidal dispersion. As is known, the presence of an external surfactant tends to increase the water sensitivity of coatings formed from aqueous resin dispersions containing the same and to adversely affect desired properties of the coatings. The presence of undue amounts of surfactant in autodepositing compositions can lead to problems, as described in U.S. Pat. No. 4,191,676, the disclosure of which is incorporated herein by reference, particularly as regards its description respecting surfactants and amounts thereof in autodepositing compositions. As discussed in this patent, the presence of an undue amount of surfactant in autodepositing compositions can deter the build-up of resin particles on the metallic surface being coated. In addition, the presence of undue amounts of surfactant can also adversely affect desired coating properties, for example, corrosion resistant properties. An advantage of internally stabilized vinylidene chloride-containing polymers is that stable aqueous dispersions, including acidic aqueous dispersions of the type comprising autodepositing compositions, can be prepared without utilizing external surfactants. (It is noted that there is a tendency in the literature to use interchangeably the following terms in connection with describing surface active materials which are used in polymerization processes for preparing polymers of the type to which the present invention relates: surfactant, wetting agent, emulsifier or emulsifying agent and dispersing agent. As used herein, the term "surfactant" is intended to be synonymous with the aforementioned.) Various types of internally stabilized vinylidene chloride-containing polymers are known and species thereof are available commercially.

Various surfactants which function to maintain polymeric particles in dispersed state in aqueous medium include organic compounds which contain ionizable groups in which the anionic group is bound to the principal organic moiety of the compound, with the cationic group being a constituent such as, for example, hydrogen, an alkali metal, and ammonium. Speaking generally, exemplary anionic groups of widely used surfactants contain sulfur or phosphorous, for example, in the form of sulfates, thiosulfates, sulfonates, sulfinates, sulfaminates, phosphates, pyrophosphates and phosphonates. Such surfactants comprise inorganic ionizable groups linked to an organic moiety.

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers. In such reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising autodepositing compositions.

With respect to particular resins that can be used in the practice of the present invention, a preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

(1) about 45 to about 99 weight percent based on the total weight of monomers used of vinylidene chloride monomer;

(2) about 0.5 to about 30 weight percent based the total weight of (1) and (2) of a second relatively more hydrophilic ethylenically unsaturated monomeric material wherein such monomeric materials has a solubility in both the water phase and the oil phase of the polymer latex of at least 1 weight percent at the temperature of polymerization; and (3) from about 0.1 to about 5 weight percent based on the total weight of other monomers of an ionic significantly water-soluble material which is copolymerizable with (2) and is selected from the group of sulfonic acids and their salts having the formula:

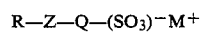

$R—Z—Q—(SO_3)^-M^+$

Examples of resins prepared from such monomers are disclosed in U.S. Pat. No. 3,617,368. As disclosed in this patent, the radial "R" is selected from the group consisting of vinyl and substituted vinyl, for example, alkyl-substituted vinyl; the symbol "Z" represents a difunctional linking group which will activate the double bond in the vinyl group; —Q— is a divalent hydrocarbon having its valence bonds on different carbon atoms; and the symbol "M+" represents a cation.

Exemplary of preferred hydrophilic monomers of (2) above, particularly when used in conjunction with monomeric vinylidene chloride are: methacrylic acid and methyl methacrylate. Other monomers which may be advantageously employed include the hydroxyethyl and propyl acrylates, hydroxyethylmethacrylate, ethyl hexylacrylate, acrylic acid, acrylonitrile, methacrylonitrile, acrylamide, and the lower alkyl and dialkylacrylamides, acrolein, methylvinyl ketone, and vinyl acetate.

Examples of the difunctional linking group (Z) which will activate the double bond present in the vinyl group include groups of the structure:

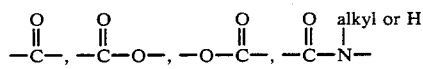

and the like. The alkyl group is preferably alkyl of 1 to 8 carbon atoms, especially methyl, ethyl or propyl. Examples of the aforementioned divalent hydrocarbon having its valence bonds on different carbon atoms include alkylene and arylene divalent hydrocarbon radicals. Although the alkylene ($CH_2$) group can contain up to about 20 carbon atoms, it will generally have 1 to about 8 carbon atoms.

The solubility of the defined copolymerizable ionic material as described herein is strongly influenced by the cation M+. Exemplary cations are the free acids, alkali metal salts, ammonium and amine salts and sulfonium and quaternary ammonium salts. Preferred are the free acids, alkali metal salts, particularly sodium and potassium, and ammonium salts.

It is further noted that, with one of the ions above, and the usual choices for R and Z, the solubility of the monomer depends on Q. As indicated, this group can be either aliphatic or aromatic and its size will determine the hydrophilic/hydrophobic balance in the molecule, that is, if Q is relatively small, the monomer is water soluble, but as Q becomes progressively larger the surface activity of such monomer increases until it becomes a soap and ultimately a water insoluble wax. It is to be understood, however, that the limiting size of Q depends on R, Z, and M+. As exemplary of the above, it has been found that sodium sulfoalkyl methacrylate of the formula:

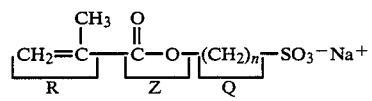

wherein n is 2, is a highly acceptable copolymerizable ionic material for use in the present invention.

Further, the selection of R and Z is governed by the reactivity needed and the selection of Q is usually determined by the reaction used to attach the sulfonic acid to the base monomer (or vice versa).

Processes for preparing latexes containing resins of the aforementioned type are known, such latexes being commercially available and being referred to herein as "self-stabilizing latexes, that is, latexes, the polymeric particles of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water (about 72 dynes/cm). It has been observed that autodepositing compositions containing such latexes form coatings which build up at a relatively fast rate.

A preferred embodiment of this invention comprises the use of vinylidene chloride-containing latexes in which a water soluble ionic material such as, for example, sodium sulfoethyl methacrylate is copolymerized with the comonomers comprising the copolymer. Sodium sulfoethyl methacrylate is particularly effective for use with monomeric vinylidene chloride and the relatively hydrophilic monomers methyl methacrylate or methacrylic acid when used in the amounts and in the manner described above.

Particularly preferred latexes for use in this invention are latexes with about 35 to about 60 weight % solids comprising a polymeric composition prepared by emulsion polymerization of vinylidene chloride with one or more comonomers selected from the group consisting of vinyl chloride, acrylic acid, a lower alkyl acrylate (such as methyl acrylate, ethyl acrylate, butyl acrylate), methacrylic acid, methyl methacrylate, acrylonitrile, methacrylonitrile, acrylamide, and methacrylamide and stabilized with sulfonic acid or sulfonic acid salt of the formula:

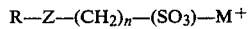

wherein R represents vinyl or lower alkyl-substituted vinyl, Z represents one of the functional groups:

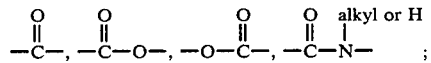

n is an integer from 1 to 20 (preferably 1 to 6) and M+ is hydrogen or an alkali metal cation, preferably sodium or potassium.

A subgroup of preferred polymers are those having at least about 50% by weight of vinylidene chloride but less than about 70%, and about 5 to about 35% vinyl chloride, and about 5 to about 20% of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and about 1 to about 3% by weight of sulfoethyl methacrylate.

A particularly preferred group of latexes, however, are latexes containing about 30 to about 70 weight % of solids formed by emulsion polymerization of about 50 to about 99% vinylidene chloride based on total weight of polymer and about 0.1 to about 5% by weight of sulfoethyl methacrylate, with optionally other comonomers selected fom the group consisting of vinyl chloride, acrylic and methacrylic monomers such as acrylonitriles, acrylamides, methacrylamides and mixtures thereof in amounts between about 5 and about 50% by weight, and substantially free of unpolymerized surfactant or protective colloid.

Among other preferred subclasses of resin for use in this invention are dispersions of copolymers of about 50 to about 90% by weight vinylidene chloride, about 5 to about 30% by weight of butyl acrylate and about 1 to about 2% by weight of sulfoethyl methacrylate based on the total weight of polymer. Another preferred subclass of polymers are the latexes of vinylidene chloride-containing polymers internally stabilized with sulfoethyl methacrylate and free of surfactant, and including optionally vinyl chloride and one or more acrylic co-monomers.

Another preferred vinylidene chloride-containing copolymer is one comprising about 15 to about 20 weight % vinyl chloride, about 2 to about 5 weight % butyl acrylate, about 3 to about 10 weight % acrylonitrile, about 1 to about 2 weight % sulfoethyl methacrylate. This particular copolymer will have less than 70% by weight vinylidene chloride copolymer based upon total weight of comonomers (including the sulfoethyl methacrylate) used in the emulsion polymerization.

In its most preferred form, the present invention comprises the curing of coatings formed from internally stabilized vinylidene chloride-containing resins of the type used in Example 1 reported hereinbelow. Such resins are of relatively high crystallinity. Exemplary crystalline resins are described in U.S. Pat. No. 3,922,451 and aforementioned U.S. Pat. No. 3,617,368. Generally speaking, crystalline vinylidene chloride-containing resins comprise a relatively high proportion of vinylidene chloride, for example, at least about 80 wt.% thereof.

With respect to preferred externally stabilized vinylidene chloride-containing resins, they contain a high proportion of vinylidene chloride, that is, in excess of 50 wt.%. The amount of vinylidene chloride comprising the resin should be less than 100 wt. % for the reason that the pure homopolymer of vinylidene chloride is thermally unstable. Examples of monomers that can be copolymerized with vinylidene chloride to form a thermally stable copolymer include one or more of vinyl chloride, acrylic acid, methacrylic acid, methacrylate, methyl methacrylate, ethylacrylate, butylacrylate, acrylonitrile, methacrylonitrile, acrylamide and methacrylamide. A few examples of externally stabilized vinylidene chloride polymers that can be used in the practice of the present invention are the following: (A) about 50 to about 90 wt. % vinylidene chloride, about 5 to about 20 wt. % actrylonitrile and about 5 to about 20 wt. % butyl acrylate; (B) about 60 to about 76 wt. % vinylidene chloride, about 4 to 10 wt. % ethylhexyl acrylate or methacrylate, and about 1 to about 4 wt. % acrylic acid; and (C) 66 wt. % vinylidene chloride and 34 wt. % vinyl chloride. In preferred form, the externally stabilized vinylidene chloride-containing resin is crystalline in nature.

Externally stabilized resins of the above type are prepared typically by emulsion polymerization utilizing a sufficient amount of surfactant to maintain the resulting resin particles in a dispersed state in the aqueous medium of the reaction mixture. The nature of this resin type is that the structure of the polymer molecule requires that surfactant be present to maintain the colloidal dispersion of the resulting latex, the surfactant being adsorbed on the surface of the resin particles.

Examples of surfactants (emulsifiers) that can be used to prepare such latexes are: sodium dodecylbenzene sulfonate, alkyl sulfates, sodium dioctyl sulfosuccinate, alkylphenolicethoxylate sulfonates, sodium dodecyldiphenyl oxide disulfonate, sodium oleoyl isopropanolamide sulfosuccinate, and sodium lauryl sulfate. These surfactants or emulsifiers are exemplary only; accordingly, it should be understood that the practice of this invention is not limited to latexes containing the aforementioned surfactants. For example, there can be used any anionic surfactant which will lower the interfacial tension between the monomeric reactants and water sufficiently to result in the formation of stable colloidal dispersions of the monomers in the water and, in addition, is stable in autodepositing compositions formulated therefrom. It is noted further that the activating system (for example, acid and oxidizer) of the autodepositing composition functions to dissolve from the metallic substrate positively charged cations which cause the negatively charged latex polymer particles to autodeposit on the metallic surface. The anionic surfactant should be a material which functions accordingly. Mixtures of two or more suitable anionic surfactants may be used.

For reasons mentioned above, and as explained in aforementioned U.S. Pat. No. 4,191,676, the surfactant concentration of externally stabilized latexes should be relatively low so that the aqueous phase of the autodepositing composition has a surfactant concentration below the critical micelle concentration and preferably below the surfactant concentraion which corresponds to the inflection point on a graph of surface tension versus the logarithm of surfactant concentration in the composition, as referred to in the forementioned '676 patent. Accordingly, it is preferred that the latex containing the externally stabilized resin be prepared by emulsion polymerization with a very low concentraion of surfactant. In the present state of the art, this is best achieved by seed polymerization or semicontinuous polymerization as opposed to batch emulsion polymerization. In the seed polymerization process or semicontinuous polymerization, the amount of surfactant can be limited by adding surfactant and monomer in such a manner that the monomer continues to polymerize with particles already present rather than forming new particles. This gives greater uniformity of particle size distribution and also gives good control of the total amount of surfactant in the latex. The stability of the colloidal latex can be partially attributed to charged polymer end groups whose provenance is the polymerization initiator.

In general, such latexes will have a relatively high surface tension, that is, at least about 40 dynes/cm. Such latexes can be used in the practice of the present invention, and preferably, there are used such latexes that have a surface tension of about 55 to 70 dynes/cm. In particular, such latexes in which there is no protective colloid are preferred class for use in the present invention.

Polymers having a vinylidene chloride content of between about 50 wt. % and about 90 wt. % or higher, based upon the total weight of polymer, can be used. When vinyl chloride is employed as one of the comonomers, the vinylidene chloride content can be less than about 70 wt. %. The total chloride content, however, is preferably 50 wt. % or more based on total polymer weight. Generally speaking, the internally stabilized latexes which are the preferred class of latexes according to this invention can be used at even lower chloride contents, thereby enabling the inclusion of other copolymers to enhance the desirable polymer characteristics such as hardness, gloss, solvent resistance and the lie, in addition to corrosion resistance attributable to reduced vapor permeability.

Latexes for use in the composition of the present invention are available commercially. Examples of such latexes are the Saran latexes such as, for example, Saran 143 and Saran 112 available from Dow Chemical Co., the Serfene latexes available from Morton Chemical, and the Haloflex latexes such as, for example, Haloflex 202 available from Imperial Chemicals Industries.

If desired, the autodepositing composition can be prepared from two or more latexes containing different resins. Such a composition will comprise a blend of the vinylidene chloride-containing polymers described above, typically in an amount of about 50 to about 95% of the total resin solids, and one or more other latexes including, for example, styrene-butadiene resins, poly(vinyl chlorides), acrylic resins and the like.

The amount of the resin comprising the coating composition of the present invention can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed, other factors being the same. Although coating compositions can be formulated with a range of about 5 to about 550 g/l of resin solids, the amount of the resin solids will tend to vary depending on the other ingredients comprising the composition and also on the specific latex or resin used. For many applications, good results can be achieved utilizing about 50 to about 100 g/l of resin solids in the composition.

Optional ingredients can be added to our composition as desired. For example, it is believed that the present invention will be used most widely in curing pigmented autodeposited coatings. For this purpose, suitable pigments can be included in the composition. Examples of pigments that can be used are carbon black, phthalocyanine blue, phthalocyanine green, quinacridone red, benzidene yellow and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using an aqueous dispersion in an amount such that the composition contains about 0.2 to about 3 g of furnace black/100 g of resin solids.

Many pigments are available in aqueous dispersions which may include surfactants or dispersing agents for maintaining the pigment particles in dispersed state. When utilizing such pigment dispersions in the composition of the present invention, they should be selected so that the surfactant concentration in the aqueous phase of the composition is below the CMC, preferably below the surfactant concentration which corresponds to the inflection point on a graph of surface tension versus the logarithm of surfactant concentration in the composition. The surfactant should preferably be selected from those indicated above with respect to the preparation of the externally stabilized latexes. Suitable pigmented compositions are illustrated in examples herein.

Colored coatings can also be cured in accordance with the present invention. They can be formed from compositions which include a dye, examples of which include rhodamine derived dyes, methyl violet, safranine, anthraquinone derived dyes, nigrosine, and alizarin cyanine green. There are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredients or additives, the total amount of surfactant in the aqueous phase of the composition should be maintained below the CMC. Preferably, the aqueous phase of the composition contains little or no surfactant.

In case a surfactant is utilized, the preferred surfactants are the anionic surfactants. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition of the present invention, the constituents thereof can be admixed in any suitable way, for example, as described in aforementioned U.S. Pat. No. 4,191,676.

Various steps of the overall coating process can be like those of the prior art, except as noted below. For example, cleaning of the metallic surface prior to coating and any water rinse steps effected subsequently to the cleaning step can be in accordance with the teachings of aforementioned U.S. Pat. No. 4,191,676. With respect to contacting the metallic surface with the autodepositing composition, it is believed that, for most applications, desired coating thicknesses can be obtained by immersing the metallic surface in the composition for a period of time within the range of about 30 seconds or even less to about 3 minutes. Good results have been achieved utilizing a time of immersion of not more than about 90 to about 100 seconds with compositions containing about 5 to about 10 wt. % of resin solids. However, it should be understood that longer or shorter periods of time can be used. Agitating the composition aids in maintaining it uniform and in improving the uniformity of the coatings formed. Other factors held constant, heating of the composition will result in heavier coatings. However, satisfactory results can be obtained by operating the coating process at ambient temperature.

Various of the autodeposited coatings which can be cured in accordance with the present invention, upon being immediately withdrawn from the coating composition, are initially tightly adherent to the metallic substrate. Others may require a short period of air drying, for example, about 30 seconds to about 2 minutes, to develop satisfactory adherence.

Water rinsing the coated surface after it has been withdrawn from the composition, and before significant drying takes place is effective in removing therefrom residuals such as acid and other ingredients of the composition that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. Further, the residuals can be removed or rendered unreactive by treatment with an alkaline solution suitable a mild alkaline solution, for example, a solution of about 0.1 to about 2 g/l of caustic. If removal of residuals is not necessary to the finish required, this step of removing them can be avoided.

Prior to curing the autodeposited coating in accordance with the present invention, it can be subjected to a treatment which is designed to increase the corrosion resistance of the coating. Examples of such treatments include rinsing the freshly applied coating with aqueous solutions of chromium compounds or with aqueous solutions of phosphoric acid. For example, U.S. Pat. Nos. 3,795,546 and 4,030,945 disclose methods of treating freshly formed autodeposited coatings with aqueous rinse solutions containing hexavalent chromium or aqueous solutions containing mixtures of hexavalent chromium and formaldehyde-reduced forms of hexavalent chromium to improve the corrosion resistance of the autodeposited coatings. U.S. Pat. No. 3,647,567 discloses the use of chromium-containing solutions and also the use of an aqueous solution of phosphoric acid. An advantage of autodeposited coatings formed from preferred vinylidene chloride-containing resins, as described above, is that they possess unusually high corrosion resistant properties without being so treated. However, they too may be so treated.

Following any rinse steps employed after the coated surface is withdrawn from the composition, the coating can be cured in accordance with the present invention. Curing of the resinous coating renders it continuous, thereby improving its resistance to corrosion and its adherence to the underlying metallic surface. Exemplary curing means include spraying the freshly coated part in hot water, immersing the freshly coated part in hot water and exposing the freshly deposited coating to an atmosphere of steam. Utilizing the present invention, heat can be transferred more quickly into the coated mass with the result that the temperatures needed for full development of coating properties are reached more quickly than they are reached when heating the coated part in air.

As mentioned above, it is believed that the curing process of the present invention will be used most widely in curing autodeposited coatings comprising resins which have a minimum film temperature (MFT) or glass transition temperature (Tg) of no greater than about 140° F., preferably no greater than about 100° F., and most preferably no greater than about 85° F. Exemplary resins of the type mentioned above can have Tg's within the range of about 30° F. to about 85° F. They can also have an accelerated cure temperature of no greater than about 300° F. With respect to resins having a Tg well below room temperature, improvements can be realized by curing with water having a temperature of at least 70° F. In general, however, it is believed that most curing applications will utilize hot water, for example, water having a temperature of 100° F. or more.

Resins which do not inherently have Tg's or MFT's in the desired range can be modified by the use of solvents or plasticizers in accordance with the state of the art to reduce their Tg and MFT values appropriately.

The temperature and time of treatment of the autodeposited coating will depend upon the nature of the particular resin comprising the coating. The treating conditions should be selected so that the properties of the coating are fully developed and so that the coating is not affected adversely. Exemplary conditions include treating times of about 5 seconds to about 5 minutes (although longer times can be used) at temperatures within the range of about 185° F. to about 212° F. (although higher temperatures can be used in the case of super heated steam). It is believed that many applications will require no more than about 2 to 3 minutes and even less time of pretreatment when using temperatures within the aforementioned range. Particularly, in the case of steam, there may be many applications in which the treating time is less than 5 seconds. Autodeposited coatings comprising vinylidene chloride-containing resins of the type described above can be properly heated or "cured" to achieve full development of coating properties by immersion of the freshly formed autodeposited coating into hot water for as little as about 5 to about 30 seconds at temperatures of about 185° F. to about 212° F.

Steam curing has a number of advantages over the "hot water cure" method described above. One advantage accruing to the use of a steam atmosphere for curing the freshly formed coating is that the parts need not be immersed. This is important when parts are being processed on a conveyor line. In order to immerse a part in hot water, the conveyor line must change directions as the part is carried down into a tank of hot water. Once the part has been "cured", the conveyor must then change directions again to remove the part from the hot water tank. By the use of steam to effect curing of the autodeposited coating, the conveyor simply carries the parts into a tunnel which contains the steam. There is no need for the conveyor to change directions as in an immersion process.

A further advantage accruing to the use of steam for curing autodeposited coatings is that steam has a higher calorific value than does hot water. For example, a gram of steam at 212° F. has a higher heat content than a gram of water at the same temperature. This provides a greater energy source for transferring energy rapidly to the freshly formed autodeposited coating. Still another advantage accruing to the use of steam is that only a relatively small amount of water need be converted to steam as opposed to raising the temperature of an entire tank of water to the operating temperature.

Post treatment steps such as rinsing the freshly formed autodeposited coating to remove therefrom residuals or rinsing in an aqueous chromium compound-containing solution and curing of the coating can be combined into one step. Thus, for example, rinsing and curing can be done simultaneously by spraying with hot water or immersing the freshly formed autodeposited coated surface into an aqueous bath. In addition, the water or steam cure process can be used in combination with heretofore known curing methods. For example, a short treating time in accordance with the curing method of the present invention can be used to quickly heat the coating (which surprisingly can result in drying of the coating) followed by baking or other curing methods, for example, curing by infrared radiation. However, it is believed that for most applications, curing can be effected completely utilizing the water or steam cure described above so that baking and like steps can be avoided entirely.

It is believed also that the present invention will be used widely in curing coatings of the type that do not tend to crack, such as is described in aforementioned U.S. Pat. No. 4,138,944. There are types of autodeposited coatings, including those formed from vinylidene chloride-containing copolymers of the type described above, as well as others, which do not tend to crack as a result of exposure to oxygen under normal plant operating conditions. Accordingly, such coatings do not require the special treatment steps described in the aforementioned patent.

EXAMPLES

Examples below are illustrative of the present invention. Comparative examples are set forth also.

Example 1 - Autodepositing Composition

This example illustrates the formulation of an autodepositing composition used to form coatings cured in accordance with the present invention. The latex used contains a vinylidene chloride copolymer which is prepared by copolymerization with a water soluble ionic stabilizer such as sodium sulfoethyl methacrylate. A composition was prepared by admixing the following:

|  | Amounts |
|---|---|
| Saran 143 latex | 93.0 g |
| Aquablak S (black pigment dispersion) | 3.0 g |
| hydrofluoric acid | 2.3 g |
| ferric fluoride | 3.0 g |
| deionized water to make | 1 liter |

The Aquablak S dispersion (available from Borden) was thinned with an equal weight of deionized water to produce a consistency approximately equal to that of the latex. While stirring continuously, the latex was slowly added to the diluted black pigment dispersion. The total elapsed time of mixing to prepare a 1 liter bath is approximately one minute. The mixing time is not critical to the preparation of performance of the bath, but is mentioned here merely to point out that careful and reproducible procedures should always be used in the preparation of a coating composition to assure uniformity from batch to batch. When the black pigment dispersion has been uniformly blended with the polymer latex, deionized water is added with continuous stirring. A solution comprising the hydrofluoric acid and the ferric fluoride is added to the mixture with continuous stirring in such a volume that the blend approaches 1 liter of volume, for example, 950 ml. Deionized water is then added to bring the total volume of composition to exactly 1 liter. The resulting composition comprises 5% by weight of polymer coating solids.

Example 2 - Curing in Hot Water

This example describes the rapid, energy efficient method of curing autodeposited coatings in hot water. Coatings of 0.5 mil thickness were formed by immersion of thick-walled hot rolled steel parts into a composition like that of Example 1. The procedure used was as follows: cleaned in hot alkaline cleaner; rinsed in tapwater; autodeposited for 90 seconds; rinsed in tapwater; and immersed for 5 seconds in water at 185° F. Coating properties such as, for example, salt spray resistance, were equivalent to those obtained by baking. After 500 hours of salt spray testing (ASTM B-117), the parts showed less than 1 mm of adhesion loss at the scribe or a rating of 9-plus out of 10, and the remainder of the part was excellent with no signs of corrosion.

The same parts required 25 minutes in a forced draft oven at 212° F. just to each curing temperature because the mass of the steel absorbed the energy before the coating could be brought to the curing temperature.

Example 3 - Curing in Steam

In this example, coatings of 0.5 mil thickness were autodeposited on cold rolled mild steel panels by immersion in a composition like that of Example 1 for 90 seconds. After removal from the coating bath, the panels were allowed to stand in air for 60 seconds to permit the supernatant coating composition to react completely with the metal surface. The panels were then rinsed in tapwater and placed in a low pressure steam chamber for curing. In two cases, oven curing was used with or without steam curing. The panels were then scribed and placed in salt spray for 168 hours and 336 hours. The following table lists the results.

|  |  | Salt Spray Performance | | | |
|---|---|---|---|---|---|
|  |  | Scribe | | Field | |
| Steam Cure Time | Oven Cure Time | 168 hr | 336 hr | 168 hr | 336 hr |
| 30 sec | — | 8 | 7 | 9 | 9 |
| 2 min | — | 8 | 7 | 9 | 9 |
| 5 min | — | 8 | 7 | 8 | 5 |
| 10 min | — | 0 | 0 | 0 | 1 |
| — | 10 min | 8 | 8 | 9 | 9 |
| 2 min | 2 min | 7+ | 7 | 9 | 9 |

The above examples illustrate well important advantages which flow from use of the present invention. It should be understood that the present invention can be utilized also in connection with curing autodeposited coatings formed on metallic surfaces other than the ferriferous surfaces which are exemplified hereinabove. Accordingly, the invention can be used widely in curing coatings on various types of metallic objects which can be used in an almost unlimited number of applications.

I claim:

1. A process for curing an uncured autodeposited coating comprising contacting a metallic surface with an autodepositing composition having resin solids dispersed in the aqueous phase of said composition to form on said surface an uncured autodeposited coating in the form of resin solids adhered thereto and subjecting said uncured autodeposited coating to steam or to water having a temperature of about 70° F. to about 212° F. for a period of time sufficient to cure said coating.

2. A process according to claim 1 wherein said coating is cured by immersion in water at a temperature of about 70° F. to about 212° F.

3. A process according to claim 1 wherein said coating is cured by treating it with steam.

4. A process according to claim 1 including rinsing residuals from said coating and curing said coating simultaneously by spraying said coating with hot water or immersing it into a hot water bath.

5. A process according to claim 1 wherein said coating is cured for a period of time of about 5 seconds to about 5 minutes at a temperature of about 185° F. to about 212° F.

6. A process according to claim 5 wherein said period of time is no longer than about 2 to 3 minutes.

7. A process according to claim 1 wherein said coating is immersed into water having a temperature of about 185° F. to about 212° F. for a period of time of about 5 to about 30 seconds.

8. A process according to claim 1, 2, 3, 4, 5, 6 or 7 wherein said coating comprises a resin having a Tg of no greater than about 140° F.

9. A process according to claim 8 wherein said coating comprises a resin having a Tg of no greater than about 100° F.

10. A process according to claim 8 wherein said coating comprises a resin having a Tg of no greater than about 85° F.

11. A process according to claim 3 wherein said steam is at atmospheric pressure.

12. A process according to claim 1 in which said autodeposited coating consists essentially of an internally stabilized vinylidene chloride copolymer.

13. A process according to claim 1 in which said autodeposited coating consists essentially of an externally stabilized vinylidene copolymer having a vinylidene chloride content in excess of 50 wt. %.

14. A process according to claim 12 or 13 wherein said copolymer is crystalline.

15. A process according to claim 1 wherein said coating consists essentially of an acrylic or alkyl-substituted acrylic resin.

16. A process according to claim 1 including forming said autodeposited coating on a metallic substrate by immersing the substrate in an autodepositing composition which includes hydrofluoric acid and ferric iron as activating ingredients.

17. A process according to claim 1 wherein said autodeposited coating is adhered to a ferriferous surface.

18. A process according to claim 16 wherein ferric iron is present in said composition in the form of ferric fluoride.

19. A process according to claim 18 wherein said substrate is a ferriferous substrate.

20. A process for curing an uncured autodeposited coating comprising: immersing a metallic surface in an autodepositing composition consisting essentially of hydrofluoric acid, ferric fluoride and dispersed in the aqueous phase of said compositioon internally stabilized, crystalline resin solids comprising at least about 80 wt. % of vinylidene chloride and having a Tg below room temperature; forming on said surface an uncured autodeposited coating having resin solids of said composition adhered thereto; and immersing said surface having thereon said uncured autodeposited coating in hot water having a temperature of 100° F. or more for a period of time sufficient to cure said coating.

21. A process according to claim 20 wherein the temperature of the water is about 185° F. to about 212° F. and the surface is immersed therein for a period of time of no longer than about 2 to 3 minutes.

22. A process according to claim 20 or 21 wherein said surface is a ferriferous surface.

23. A process according to claim 22 wherein said uncured coating is rinsed with water to remove therefrom residuals of said composition prior to immersing said surface in said hot water.

* * * * *